United States Patent [19]

Yamauchi et al.

[11] Patent Number: 5,568,601
[45] Date of Patent: Oct. 22, 1996

[54] SAMPLING POINT GENERATING APPARATUS

[75] Inventors: Toshiya Yamauchi; Yoshikazu Yutani; Rika Toyoda, all of Yokohama, Japan

[73] Assignee: Fujitsu Limited, Kawasaki, Japan

[21] Appl. No.: 273,852

[22] Filed: Jul. 12, 1994

[30] Foreign Application Priority Data

Oct. 6, 1993 [JP] Japan .................................. 5-250518

[51] Int. Cl.$^6$ ..................................................... G06F 15/00
[52] U.S. Cl. ..................................................... 395/142
[58] Field of Search ..................................... 395/140, 141, 395/142, 133, 134

[56] References Cited

U.S. PATENT DOCUMENTS 5,261,033  11/1993  Oka ........................................... 395/142
5,357,602  10/1994  Ohta .......................................... 395/142

OTHER PUBLICATIONS

Karow, Peter, *Digital Formats for Typefaces*, Appendix X: Marking Rules, May 18, 1989, pp. 410–417, ISBN 4-946454-01-2, printed in Japan (with attached English language translation).

*Primary Examiner*—Phu K. Nguyen
*Attorney, Agent, or Firm*—Staas & Halsey

[57] ABSTRACT

A sampling point generating apparatus generates sampling points on an original curve even at gentle slope portions of the original curve and, according to the sampling points, provides a curve that closely approximates the original curve. To accomplish this function, the apparatus has a unit for drawing a straight line between the start and end points of the original curve; a unit for calculating errors between the coordinates of the original curve and the coordinates of the straight line; a unit for detecting extremal value points, where increase or decrease in the errors is reversed, according to the errors; and a unit for generating intermediate points among the extremal value points. The extremal value points and intermediate points are used as sampling points to provide a cubic curve that closely approximates the original curve.

3 Claims, 12 Drawing Sheets

START POINT    END POINT

θ : A THRESHOLD OF ANGULAR CHANGE

SAMPLING POINT GENERATING APPARATUS

BACKGROUND OF THE INVENTION

1. Field of the Invention

The present invention relates to a sampling point generating apparatus for generating sampling points on an original curve and forming a cubic curve that approximates the original curve.

Output units such as displays and printers are required to provide high-quality outputs. One method of providing high-quality character outputs is to employ outline fonts that express each character as outlines.

Outline fonts usually employ spline curves and Bezier curves represented by cubic expressions. Sampling points to form a cubic curve are obtained on an original curve through complicated calculations such as spline smoothing calculations. These calculations take time and reduce the processing speed. There is a technique for finding sampling points on an original curve according to the angle of each vector on the original curve but the quality of cubic curves provided by this technique is poor. It is thus required to provide a sampling point generating apparatus that speedily generates sampling points to form a cubic curve that precisely represents a character outline.

2. Description of the Related Art

A sampling point generating apparatus according to a prior art calculates an angle formed between straight lines that pass through adjacent coordinates on an original curve, and if the angle exceeds a given threshold, generates sampling points at the coordinates. The start and end points of the original curve also serve as sampling points. The coordinates of the sampling points are stored in a memory. The sampling points are interpolated to provide a curve that approximates the original curve.

This approximate curve does not include gentle slope portions contained in the original curve. This problem occurs because the prior art generates the sampling points according to angles formed by straight lines and discards small angles below a threshold, so that no sampling points are formed on the gentle slope portions.

SUMMARY OF THE INVENTION

The object of the present invention is to provide a 10 sampling point generating apparatus that generates sampling points even on gentle slope portions in an original curve, to form an approximate curve that is very close to the original curve.

In order to accomplish the object, a sampling point generating apparatus according to a first aspect of the present invention has a straight line coordinate calculation unit for drawing a straight line between the start and end points of an original curve, an error calculation unit for calculating errors between the coordinates of the original curve and the coordinates of the straight line, an extremal error value point detection unit for detecting an extremal error value point where the increase or decrease in an error is reversed, and an auxiliary point generation unit for generating an auxiliary point, i.e., an intermediate point between the extremal error value point and a previously detected extremal error value point. The apparatus provides the extremal error value points and auxiliary points as sampling points to form a cubic curve.

In this apparatus, the straight line coordinate calculation unit calculates the coordinates of a straight line connecting the start and end points of an original curve. The error calculation unit calculates errors between the coordinates of the straight line and the coordinates of the original curve. Each of the errors corresponds to a differences between the X-coordinate of the straight line and that of the original curve with respect to the same Y-coordinate.

The extremal error value point detection unit detects extremal error value points where the increase or decrease in the errors is reversed. The auxiliary point generation unit generates auxiliary points, i.e., intermediate points among the extremal error value points including the start and end points of the original curve. These start point, end point, extremal error value points, and intermediate points serve as sampling points. The sampling points are interpolated with curves, to form a curve that approximates to the original curve.

A sampling point generating apparatus according to a second aspect of the present invention has, in addition to the components of the first aspect, a extremal curve value point detection unit for detecting extremal curve value points on an original curve. These points serve to find sampling points.

In this apparatus, the extremal curve value point detection unit detects extremal value points in the X- and Y-coordinates of the original curve. At the extremal value points, an increase or decrease in the X- or Y-coordinates is reversed. The apparatus draws straight lines connecting the extremal value points and the start and end points of the original curve. Thereafter, the same steps as those in the first aspect are taken.

A sampling point generating apparatus according to a third aspect of the present invention has, in addition to the components of the second aspect, a curve inflection point detection unit for detecting inflection points where an increase or decrease in the inclinations of tangents of an original curve is reversed. The inflection points serve to find sampling points.

In this apparatus, the extremal curve value point detection unit detects extremal value points on an original curve, and the curve inflection point detection unit detects inflection points where an increase or decrease in the inclinations of tangents of the original curve is reversed. The apparatus draws straight lines connecting the extremal value points, inflection points, and the start and end points of the original curve. Thereafter, the same steps as those of the first aspect are taken.

DESCRIPTION OF THE PREFERRED EMBODIMENTS

Figure 1:
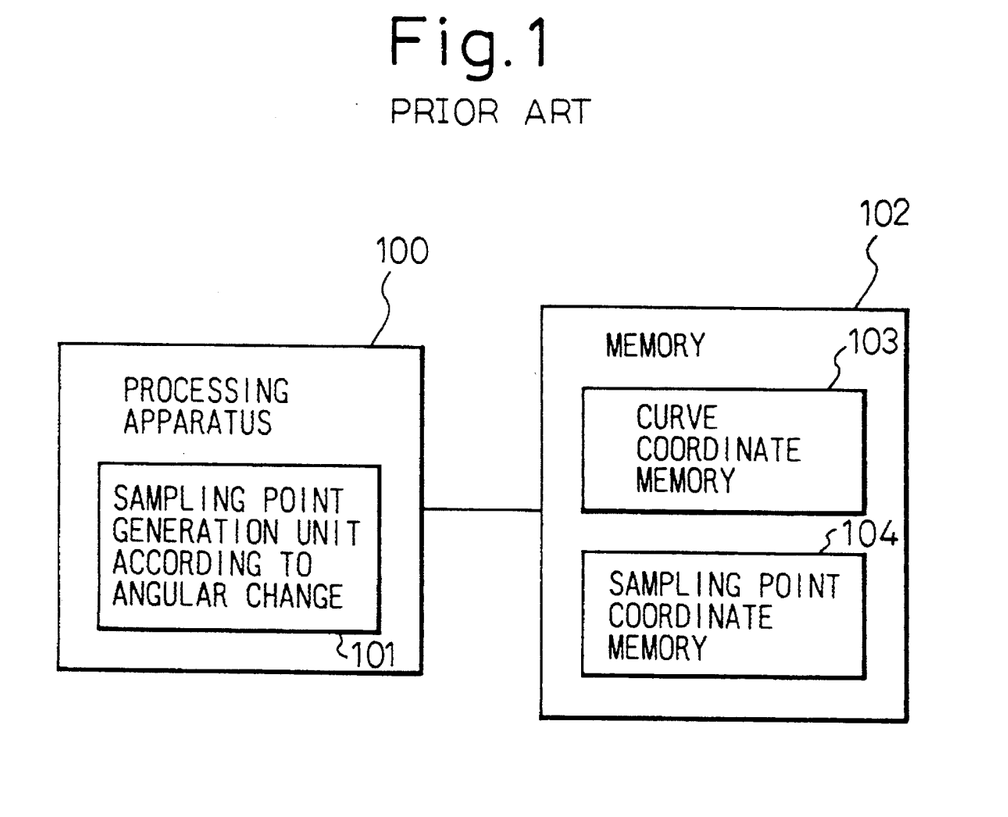
FIG. 1 shows a prior art sampling point generating apparatus.
Figure 2A:
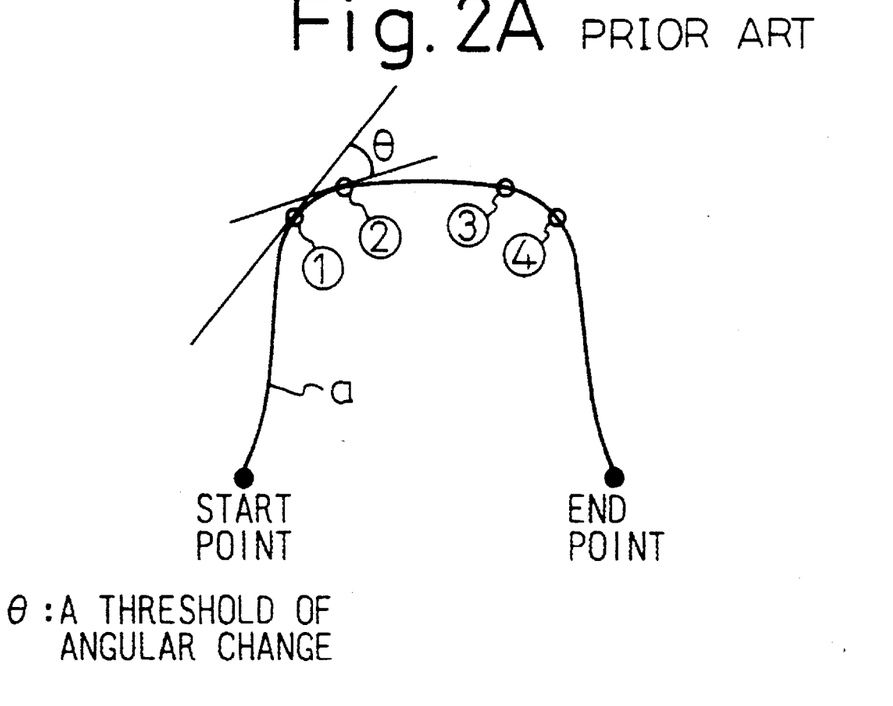
FIGS. 2A and 2B show examples of curves according to the prior art.
Figure 2B:
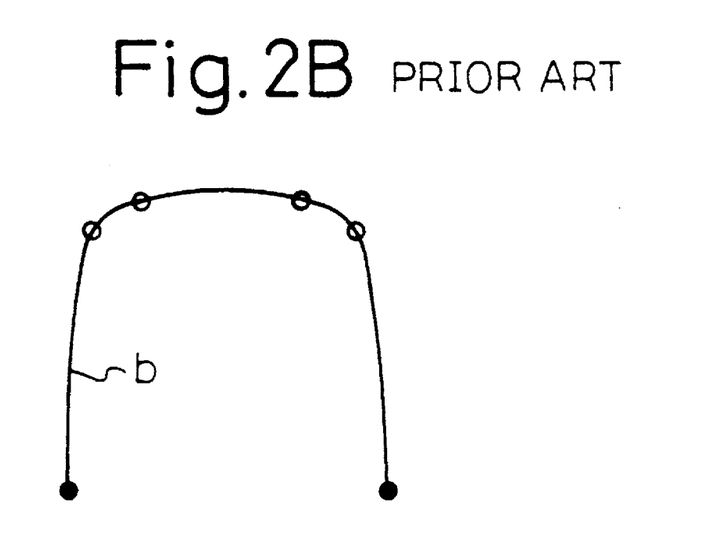

For a better understanding of the preferred embodiments of the present invention, the problems in the prior art will be explained with reference to FIGS. 1, 2A, and 2B, in which FIG. 1 shows a sampling points generating apparatus according to the prior art and FIGS. 2A and 2B show examples of curves according to the prior art.

The apparatus of FIG. 1 generates sampling points on an original curve and forms a cubic curve according to the sampling points. The apparatus has a processing apparatus 100 having a CPU, and a memory 102. This apparatus calculates an angle formed by straight lines that pass through the adjacent coordinates of the original curve, and if the angle exceeds a given threshold, generates sampling points at the coordinates.

The operations of the prior art will be explained with reference to FIGS. 2A and 2B.

FIG. 2A shows an original curve a on which sampling points are generated to form an approximate curve. The coordinates of the original curve a are stored in a memory 103. The processing apparatus 100 has a sampling point generation unit 101 for generating sampling points according to angular changes. The unit 101 draws straight lines passing through the adjacent coordinates of the original curve stored in the memory 103. The intervals between the adjacent coordinates are small. The unit 101 finds an angle between the straight lines. If the angle exceeds a given threshold, the unit 101 stores the coordinates as sampling point coordinates in a memory 104. Consequently, the memory 104 stores sampling points (1) to (4) as shown in FIG. 2A. The start and end points of the original curve are also stored as sampling points.

The coordinates stored in the memory 104 are interpolated with cubic curves expressed with spline and Bessel functions, to provide the curve of FIG. 2B.

In this way, the prior art of FIG. 1 provides the curve of FIG. 2B with respect to the original curve of FIG. 2A by generating sampling points according to angles and by interpolating the sampling points with curves. The problem of this technique is that gentle slope portions of the original curve of FIG. 2A disappear in the curve of FIG. 2B. This is because these gentle curve portions provide no sampling points since an angle formed by straight lines passing through the adjacent coordinates of each gentle curve portion is smaller than the threshold.

Figure 3:
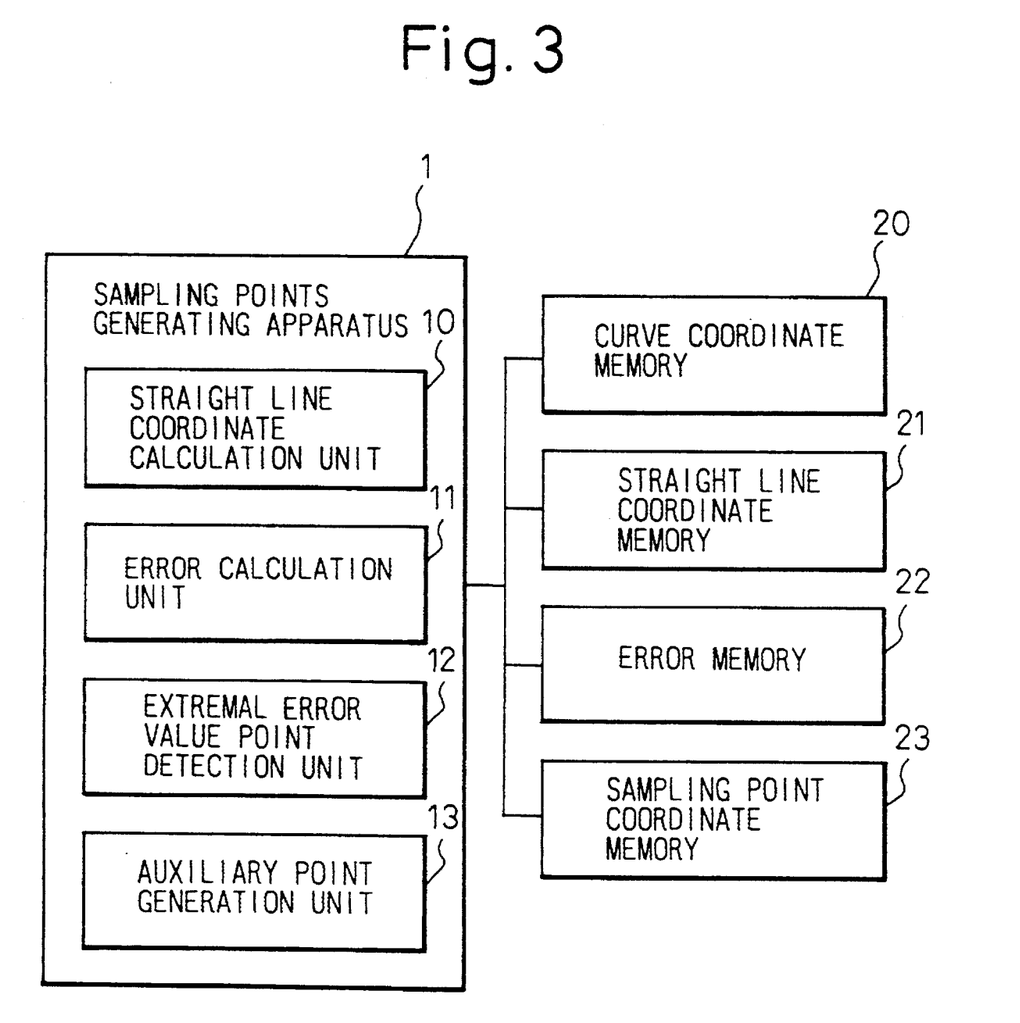
FIG. 3 shows a first aspect of the present invention.

FIG. 3 shows a basic arrangement of a sampling point generating apparatus according to the first aspect of the present invention.

The sampling point generating apparatus 1 includes a straight line coordinate calculation unit 10 for finding the coordinates of a straight line extending between the start and end points of an original curve, an error calculation unit 11 for calculating errors between the straight line and the original curve, an extremal error value point detection unit 12 for detecting extremal error value points according to the errors, an auxiliary point generation unit 13 for generating an auxiliary point, i.e., an intermediate point between the extremal error value point and a previously detected extremal error value point, and memories 20 to 23. The memory 20 stores the coordinates of the original curve, the memory 21 stores the coordinates of the straight line, the memory 22 stores the errors, and the memory 23 stores the coordinates of sampling points.

Before generating sampling points, the coordinates of the original curve are stored in the memory 20. The straight line coordinate calculation unit 10 calculates the coordinates of the straight line that connects the start and end points of the original curve, and stores the coordinates in the memory 21. The error calculation unit 11 calculates errors between the coordinates of the straight line in the memory 21 and the coordinates of the original curve in the memory 20. Each of the errors corresponds to a difference between the Y-coordinate of the straight line and that of the original curve on the same X-coordinate. The errors are stored in the memory 22.

The extremal error value point detection unit 12 checks the errors in the memory 22 and finds each extremal value point according to the errors. The extremal value points are stored as sampling points in the memory 23. The extremal error value points are each a location where an increase or decrease in the errors is reversed. The auxiliary point generation unit 13 generates auxiliary points, i.e., intermediate points between the extremal error value points and the start and end points of the original curve and stores them as sampling points in the memory 23. Accordingly, the memory 23 stores, as sampling points, the start and end points of the original curve, the error extremal value points, and the intermediate points. These sampling points are interpolated with curves, to provide a curve that approximates the original curve.

In this way, the apparatus, according to the first aspect of the present invention, draws a straight line between the start and end points of an original curve, calculates differences between the coordinates of the straight line and original curve, detects according to the differences an extremal value point where an increase or decrease in the differences is reversed, and finds an auxiliary point, i.e., an intermediate point between the new extremal value point and a previously detected extremal value point. The extremal value points and intermediate points are used as sampling points, which are interpolated with curves to provide a curve that approximates the original curve.

Figure 4:
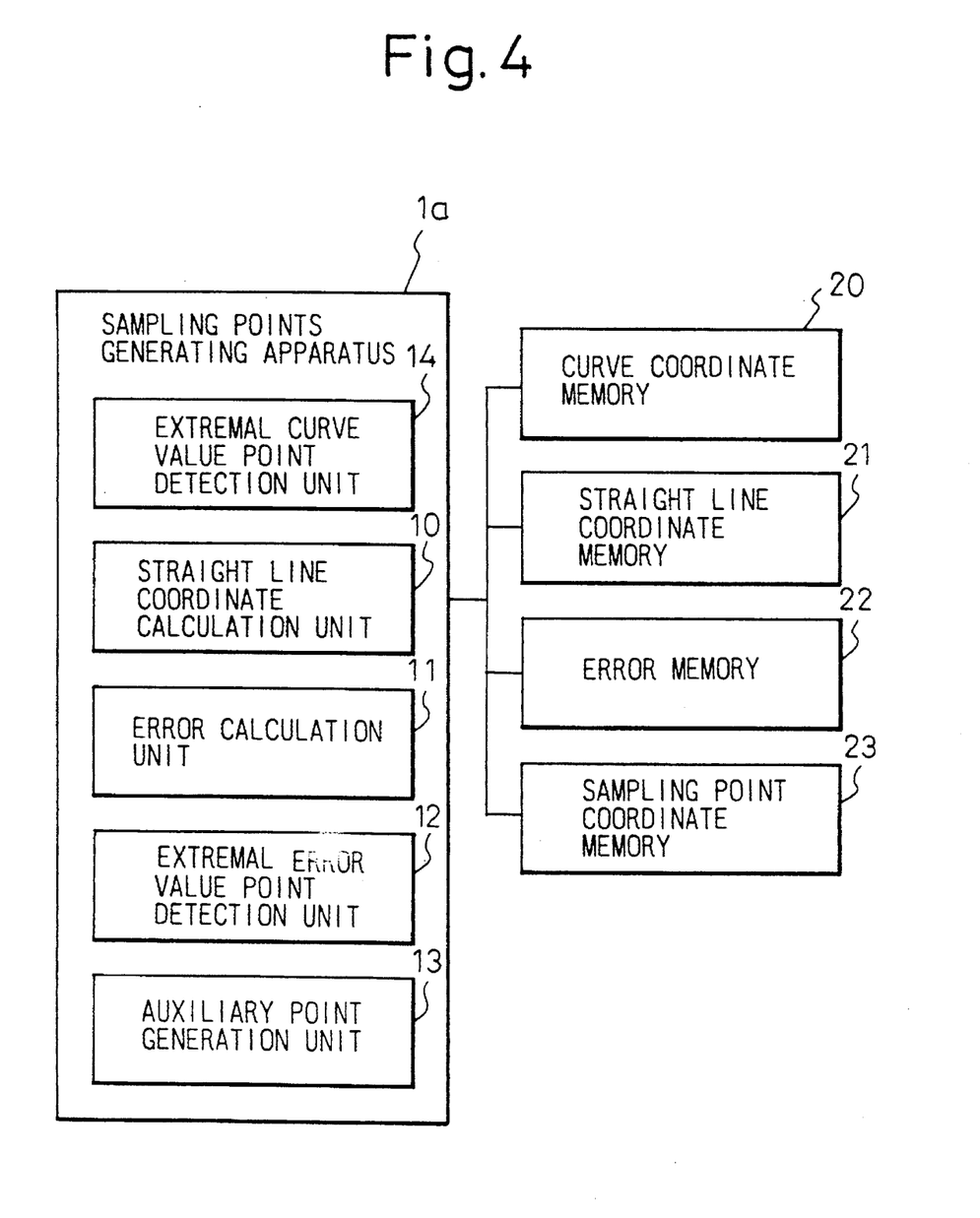
FIG. 4 shows a second aspect of the present invention.

FIG. 4 shows a basic arrangement of a sampling point generating apparatus according to the second aspect of the present invention.

The sampling point generating apparatus 1a has the same components 10 to 13 and 20 to 23 as those of the arrangement of FIG. 3. In addition, it has a extremal curve value point detection unit 14.

The memory 20 stores the coordinates of an original curve. The extremal curve value point detection unit 14 finds extremal value points on the original curve, and these extremal value points are used as sampling points to provide a curve that approximates the original curve.

First, the extremal curve value point detection unit 14 checks the coordinates of the original curve in the memory 20, detects each extremal value point according to the X- and Y-coordinates of the original curve, and stores them as sampling points in the memory 23. At each extremal value point, an increase or decrease in the X- or Y-coordinates is reversed. The straight line coordinate calculation unit 10 draws straight lines connecting the start and end points of the original curve and the extremal curve value points. The coordinates of these straight lines are stored in the memory 21. The error calculation unit 11 calculates errors between the coordinates of the straight lines in the memory 21 and the coordinates of the original curve in the memory 20. The errors are stored in the memory 22.

The error extremal value point detection unit 12 detects extremal value points according to the errors and stores them as sampling points in the memory 23. The auxiliary point generation unit 13 generates auxiliary points, i.e., intermediate points between the start and end points of the original curve, the extremal curve value points, and the extremal error value points. The intermediate points are stored as sampling points in the memory 23. Accordingly, the memory 23 stores, as sampling points, the start and end points of the original curve, the curve extremal value points, the error extremal value points, and the intermediate points. The sampling points are interpolated with curves, to provide a curve that approximates the original curve.

Figure 5:
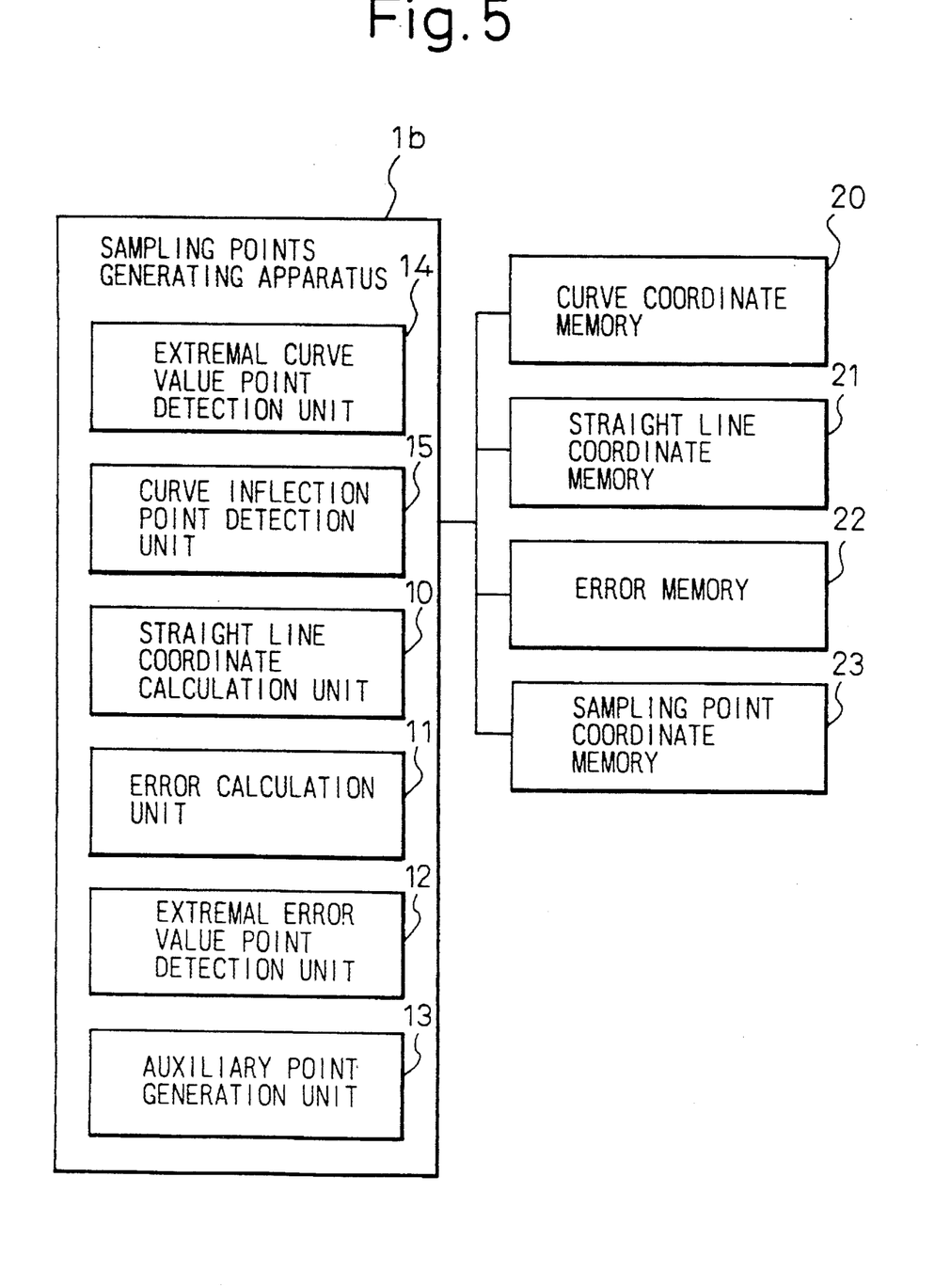
FIG. 5 shows a third aspect of the present invention.

FIG. 5 shows a basic arrangement of a sampling point generating apparatus according to the third aspect of the present invention. This apparatus 1b has the same components 10 to 14 and 20 to 23 as those of FIG. 4. In addition, the apparatus 1b has a curve inflection point detection unit 15.

Similar to the arrangements of FIGS. 3 and 4, the memory 20 stores the coordinates of an original curve. Compared with the arrangement of FIG. 4, the arrangement of FIG. 5 is characterized by the curve inflection point detection unit 15.

The extremal curve value point detection unit 14 checks the coordinates of the original curve in the memory 20, detects extremal curve value points according to the coordinates, and stores them as sampling points in the memory 23. The curve inflection point detection unit 15 finds inflection points on the original curve. At each inflection point, an increase or decrease in the inclinations of the curve is reversed.

The straight line coordinate calculation unit 10 draws straight lines connecting the start and end points of the original curve, the curve extremal value points, and the curve inflection points. The coordinates of the straight lines are stored in the memory 21. The error calculation unit 11 detects differences between the coordinates of the straight lines in the memory 21 and the coordinates of the original curve in the memory 20 and stores them in the memory 22. The extremal error value point detection unit 12 finds extremal error value points according to the errors and stores them as sampling points in the memory 23. The auxiliary point generation unit 13 generates auxiliary points, i.e., intermediate points among the start and end points of the original curve, the curve extremal value points, the curve inflection points, and the error extremal value points. The intermediate points are stored as sampling points in the memory 23. Accordingly, the memory 23 stores, as the sampling points, the start and end points of the original curve, the extremal curve value points, the curve inflection points, the extremal error value points, and the intermediate points. These sampling points are interpolated with curves to provide a curve that approximates the original curve.

In this way, the apparatus according to the present invention picks up as sampling points characteristic points such as extremal error value points, extremal curve value points, and curve inflection points of an original curve as well as intermediate points among the characteristic points even if the original curve involves gentle slope portions, and according to the sampling points, speedily provides a curve that approximates the original curve.

Figure 6:
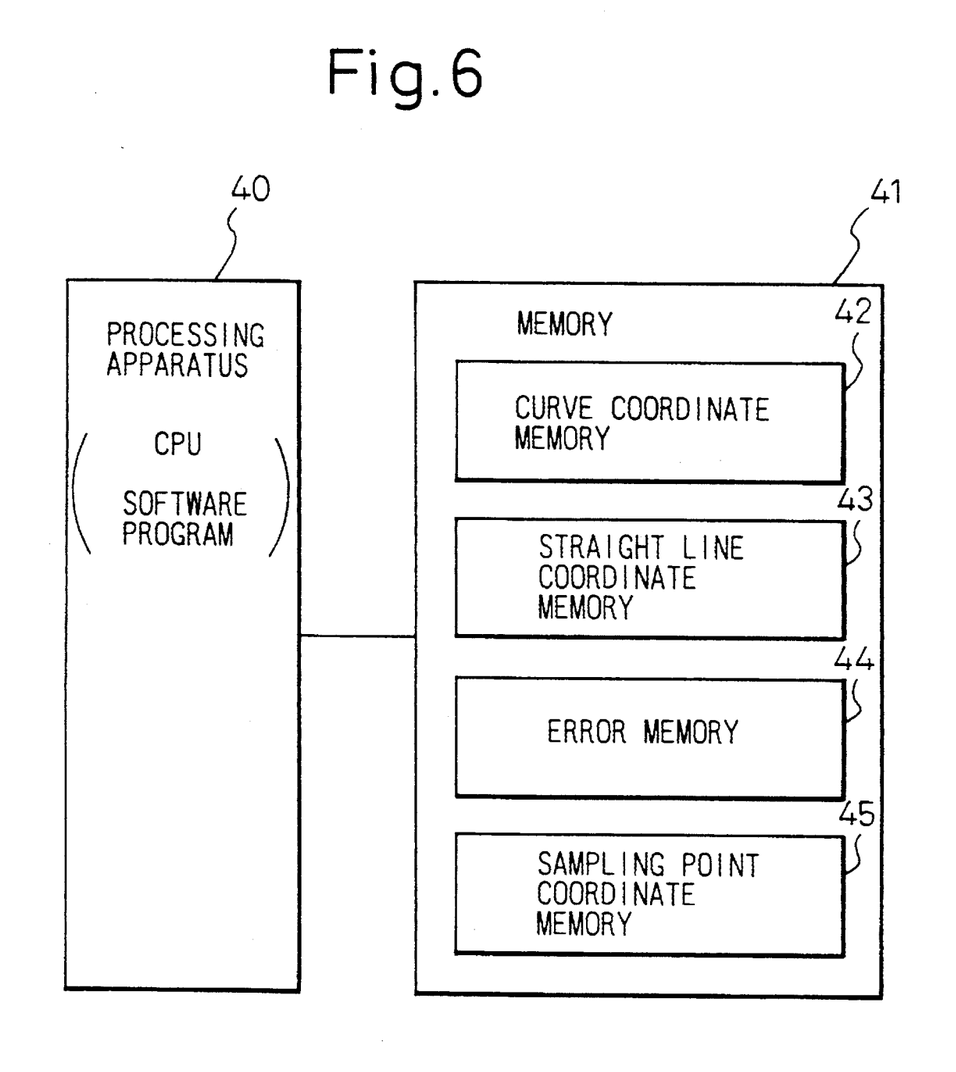
FIG. 6 shows an arrangement of hardware according to the present invention.
Figure 7:
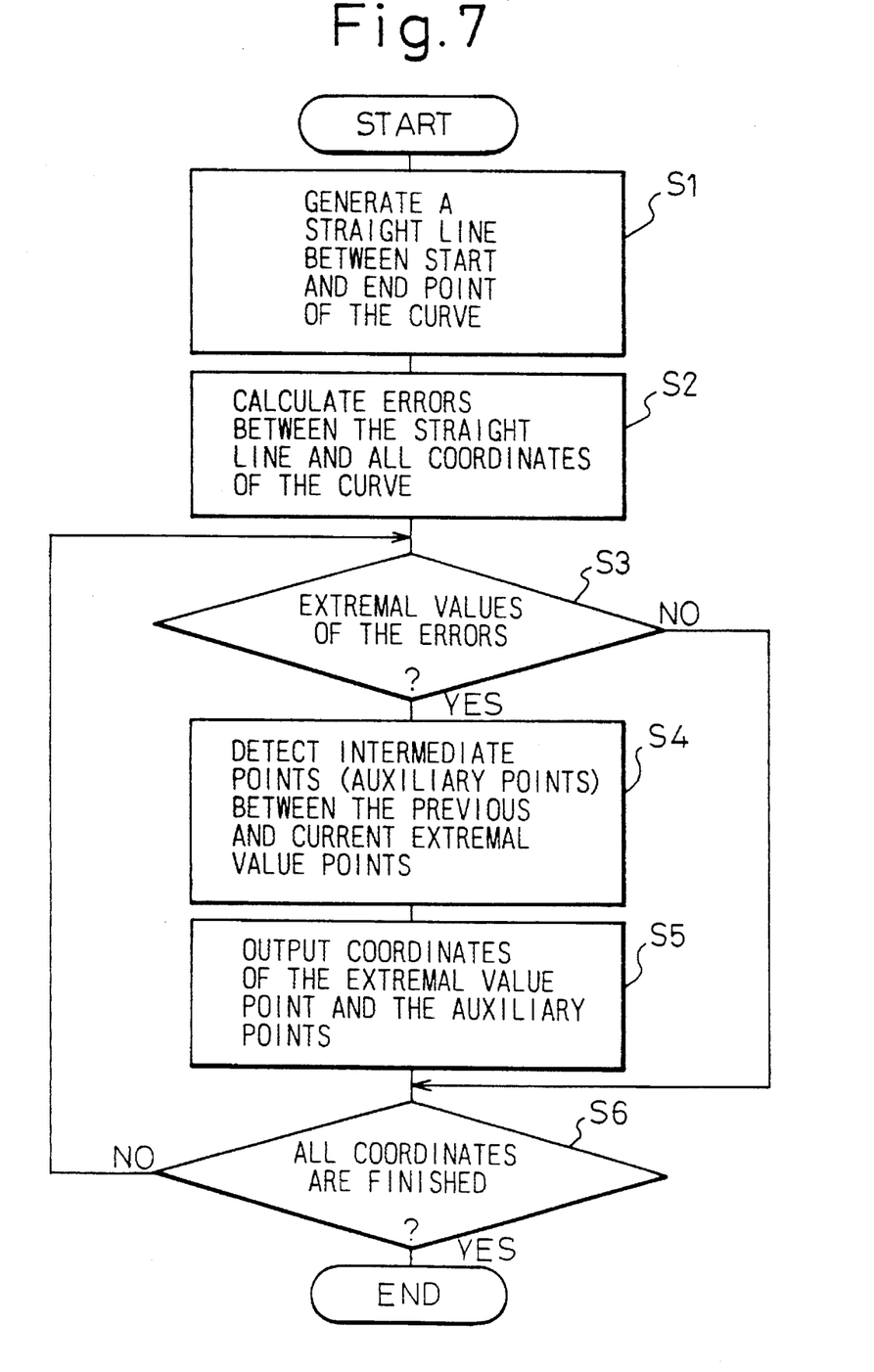
FIG. 7 is a flowchart according to a first embodiment of the present invention.
Figure 9:
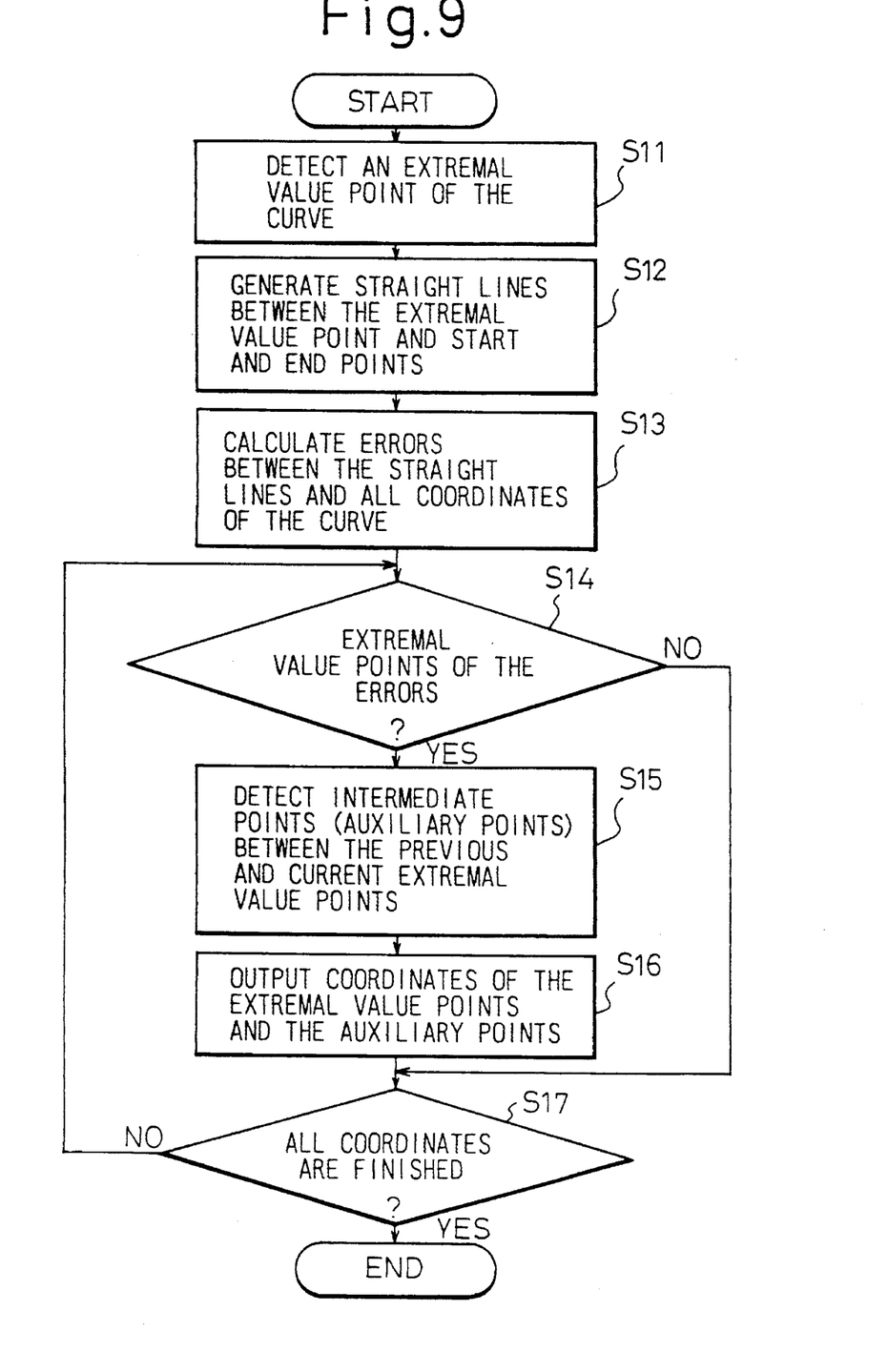
FIG. 9 is a flowchart according to a second embodiment of the present invention.
Figure 11:
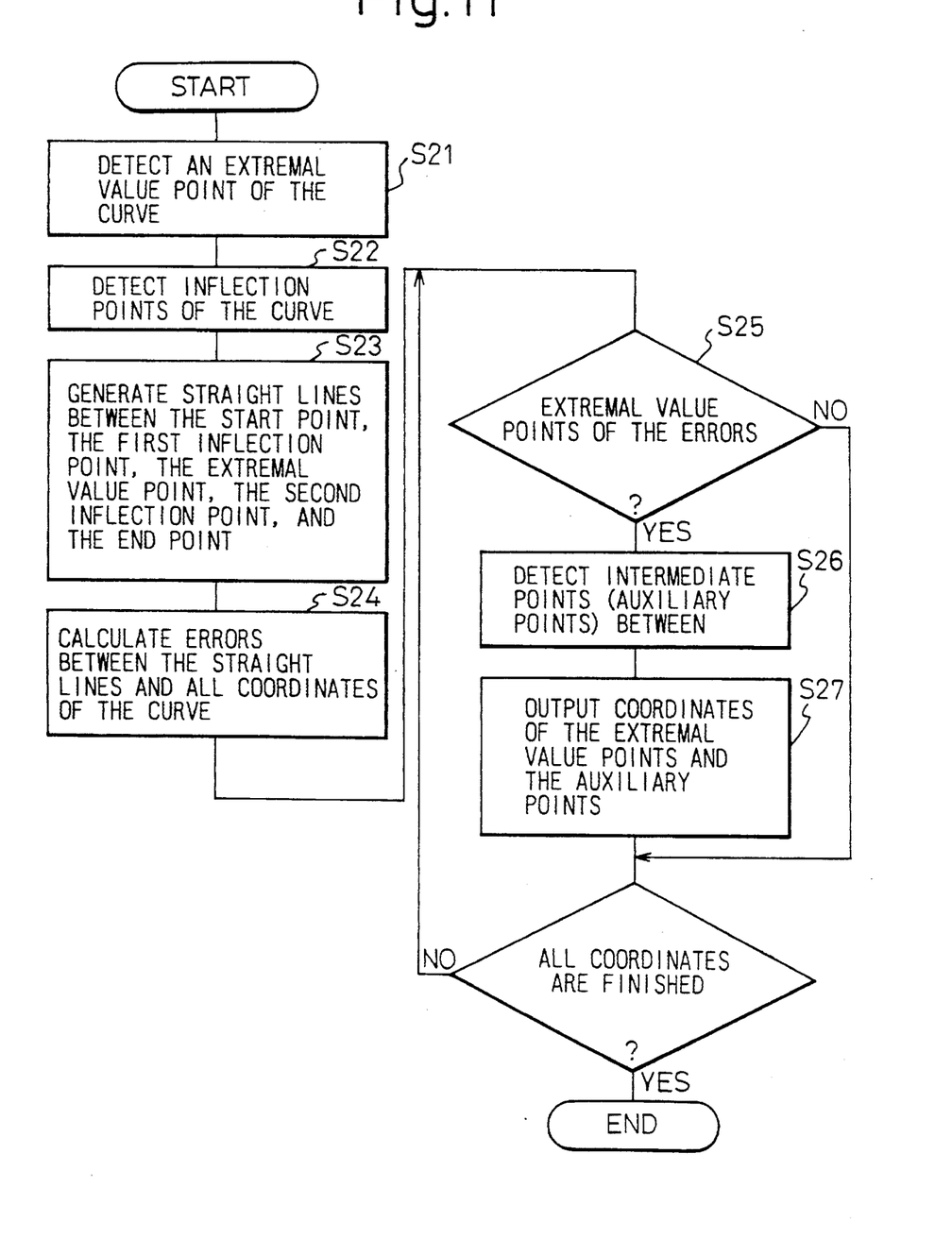
FIG. 11 is a flowchart according to a third embodiment of the present invention.

FIG. 6 shows an arrangement of hardware according to the present invention, FIG. 7 is a flowchart showing the first embodiment, FIG. 9 is a flowchart showing the second embodiment, and FIG. 11 is a flowchart showing the third embodiment of the present invention. The first to third embodiments correspond to the first to third aspects of FIGS. 3 to 5, respectively.

The arrangement of FIG. 6 has a processing apparatus 40 having a CPU and a program memory, and a memory set 41 including memories 42 to 45. The memory 42 stores the coordinates of an original curve. These coordinates are stored before finding sampling points on the original curve. The memory 43 stores the coordinates of straight lines connecting some of the coordinates of the original curve. The memory 44 stores errors between the coordinates of the original curve and the coordinates of the straight lines. The memory 45 stores sampling points. This hardware arrangement carries out any one of the first to third aspects of the present invention, to provide sampling points. It is possible to realize the memory set 41 in an external storage unit.

Figure 8A:
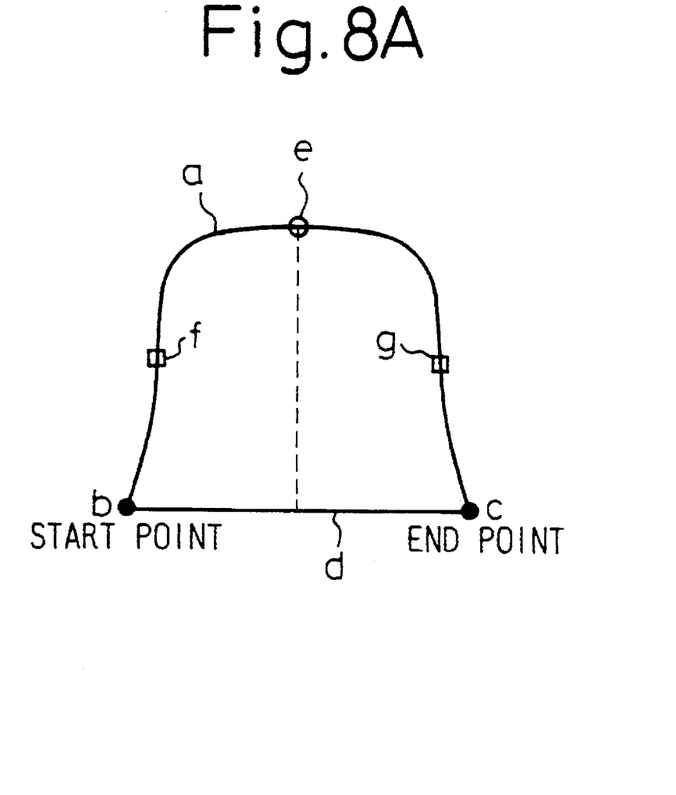
FIGS. 8A and 8B show sampling points and curves according to the first embodiment of the present invention.
Figure 8B:
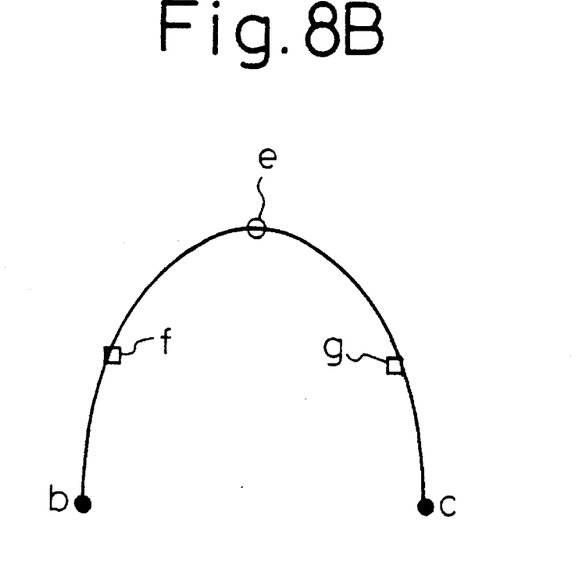

The flowchart of FIG. 7 of the first embodiment will be explained with reference to FIGS. 8A and 8B, in which FIG. 8A shows the coordinates of an original curve and FIG. 8B shows sampling points and curves interpolating the sampling points according to the first embodiment.

Step S1 of FIG. 7 finds the start and end points of the original curve in the memory 42 and draws a straight line between the start and end points. In FIG. 8A, the original curve a has the start and end points b and c indicated with black dots. The points b and c are connected to each other with the straight line d. The coordinates of the straight line d are stored in the memory 43.

Step S2 calculates errors between the coordinates of the original curve a in the memory 42 and the coordinates of the straight line d in the memory 43. The errors are stored in the memory 44.

Step S3 picks out one of the errors in the memory 44 and determines whether or not the error corresponds to an extremal value point. If the error at the current point is smaller than the error at the previous point, and the error at the next point, or the error at the current point is larger than the error at the previous point, and the error at the next point, the current point is determined to be an extremal error value point. In FIG. 8A, an extremal error value point e indicated with a white dot is detected between the start point b and the end point c according to errors, i.e., differences between Y-coordinates on the same X-coordinate.

Step S4 detects an auxiliary point, i.e., an intermediate point between the current extremal value point detected by the step S3 and a previously detected extremal value point, if the previous one is in the memory 45. If there is no previous extremal value point, intermediate points between the current extremal point and the start and end points are obtained. In FIG. 8A, a point f between the start point b and the extremal value point e as well as a point g between the extremal value point e and the end point c is obtained as an intermediate point indicated with square dots. Each of the intermediate points is located in the middle of a segmental curve between the corresponding points.

Step S5 stores the coordinates of the extremal error value point, intermediate points, and start and end points as the coordinates of sampling points in the memory 45. Step S6 determines whether or not all of the errors have been checked, and if not, the flow returns to the step S3. In FIG.

8A, the start point a, auxiliary point f, extremal value point e, auxiliary point g, and end point c are sampling points. These sampling points are interpolated with curves, to provide the approximate curve of FIG. 8B.

In this way, the first embodiment selects as sampling points the characteristic points such as extremal error value points of an original curve as well as intermediate points among the characteristic points, and according to the sampling points, creates a curve, that approximates the original curve, at high speed.

Figure 10A:
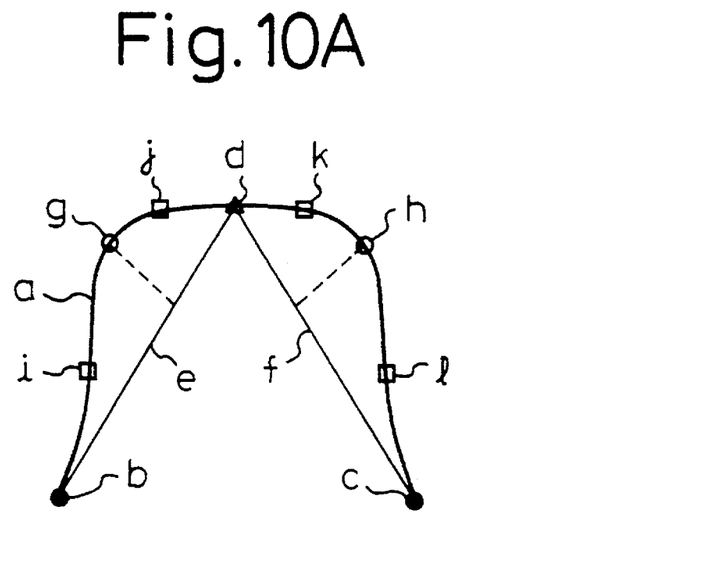
FIGS. 10A and 10B show sampling points and curves according to the second embodiment of the present invention.
Figure 10B:
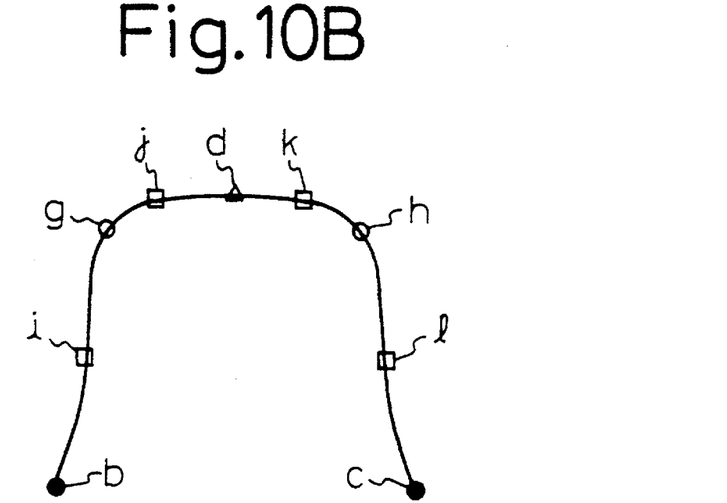

The flowchart of FIG. 9 according to the second embodiment of the present invention will be explained with reference to FIGS. 10A and 10B, in which FIG. 10A shows the coordinates of an original curve and FIG. 10B shows sampling points and an approximate curve obtained by interpolating the sampling points according to the second embodiment.

Step S11 of FIG. 9 detects extremal curve value points on the original curve according to the X- and Y-coordinates of the original curve in the memory 42. The coordinates of the extremal value points are saved as the coordinates of sampling points in the memory 45. In FIG. 10A, a point d indicated with a triangle dot where an increase or decrease in the X- or Y-coordinates of the original curve is reversed is the extremal curve value point.

Step S12 draws straight lines connecting the start, extremal value, and end points of the original curve. The coordinates of the straight lines are stored in the memory 43. In FIG. 10A, a straight line e is drawn between the start point a and the extremal value point d, and a straight line f between the extremal value point d and the end point c.

Step S13 calculates errors between the coordinates of the original curve and the coordinates of the straight lines. Step S14 picks up one of the errors and determines whether or not the error corresponds to an extremal error value point. The step S14 is the same as the step S3 of FIG. 7. Step S15 refers to the memories 42 and 45 and generates an auxiliary point, i.e., an intermediate point between the current extremal error value point and a previously detected extremal error value point in the memory 45 (if there is no previous point, the start point is employed). Step S16 stores the coordinates of the current extremal error value point and an intermediate point as the coordinates of sampling points in the memory 45. Step S17 determines whether or not all of the errors have been checked, and if not, the flow returns to the step S14.

In FIG. 10A, a point g is an extremal error value point according to the errors between the original curve a and the straight line e, and a point h is an extremal error value point according to the errors between the original curve a and the straight line f. The points g and h are indicated with white dots in the figure. One of the intermediate points (auxiliary points) indicated with square dots is a point i between the points b and g. The others are j, k, and l. The coordinates of these extremal error value points and intermediate points are stored as the coordinates of sampling points in the memory 45.

The sampling points b, i, g, j, d, k, h, l, and c of FIG. 10A stored in the memory 45 are interpolated with curves, to provide the approximate curve of FIG. 10B at a high speed. With these sampling points including the characteristic points such as the extremal curve value points and extremal error value points as well as the intermediate points, the approximate curve of FIG. 10B is more closer to the original curve than the approximate curve of FIG. 8B.

Figure 12A:
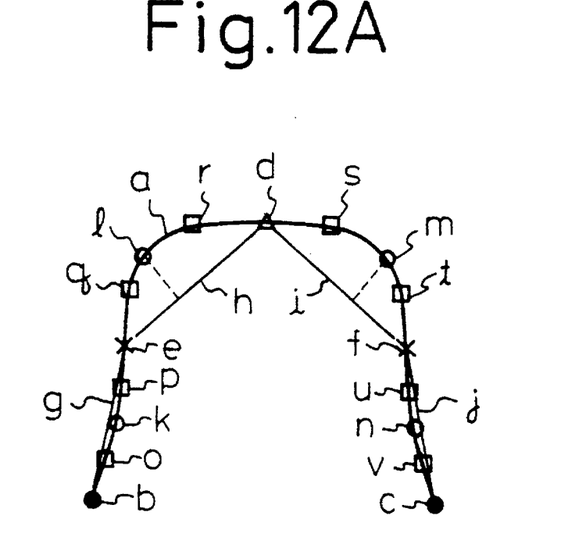
FIGS. 12A and 12B show sampling points and curves according to the third embodiment of the present invention.
Figure 12B:
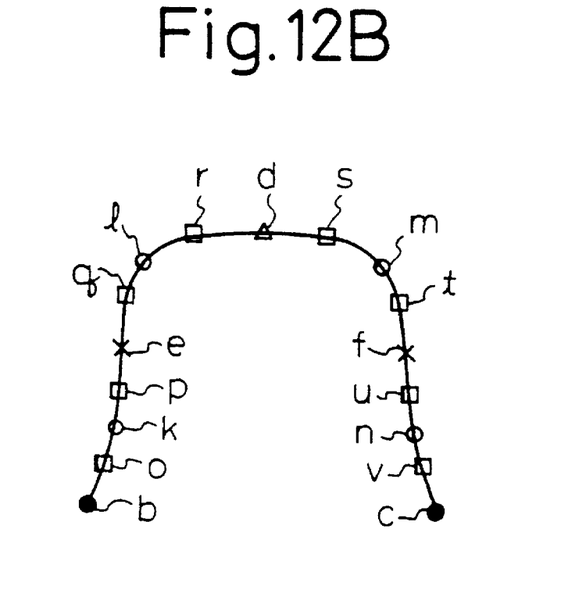

The flowchart of FIG. 11 according to the third embodiment of the present invention will be explained with reference to FIGS. 12A and 12B, in which FIG. 12A shows the coordinates of an original curve and FIG. 12B shows sampling points and an approximate curve formed by interpolating the sampling points with curves according to the third embodiment.

Step S21 of FIG. 11 detects extremal curve value points on the original curve and stores them as sampling points in the memory 45. This step is the same as the step S11 of FIG. 9. In FIG. 12A, a point d indicated with a triangle dot is detected as on extremal curve value point on the original curve.

Step S22 detects inflection points on the original curve and saves them as sampling points in the memory 45. At each inflection point, an increase or decrease in the inclinations of tangents of the original curve is reversed. In FIG. 12A, inflection points are e and f indicated with x marks.

Step S23 draws straight lines connecting the start point, a extremal curve value point, inflection points, and the end point of the original curve. The coordinates of the straight lines are saved in the memory 43. In FIG. 12A, a straight line g is drawn between the start point b and the inflection point e, a straight line h between the inflection point e and the extremal value point d, a straight line i between the extremal value point d and the inflection point f, and a straight line j between the inflection point f and the end point c.

Step S24 calculates errors between the coordinates of the original curve and the coordinates of the straight lines. Step S25 picks up each of the errors and determines whether or not the error corresponds to an extremal error value point. This step is the same as the step S3 of FIG. 7. According to the data stored in the memories 42 and 45, step S26 generates an auxiliary point, i.e., an intermediate point between the extremal error value point and a previously detected extremal error value point stored in the memory 45 (if there is no previous point, the start point of the original curve is used as the previous point). Step S27 stores the coordinates of the extremal error value point and intermediate point as the coordinates of sampling points in the memory 45. Step S28 determines whether or not all of the errors have been checked, and if not, the flow returns to the step S25.

In FIG. 12A, points k, l, m, and n indicated with white dots are the extremal error value points, and the point k is detected in the errors between the original curve a and the straight line g, the point l in the errors between the original curve a and the straight line h, the point m in the errors between the original curve a and the straight line i, and the point n in the errors between the original curve a and the straight line j. The auxiliary points, i.e., intermediate points between these points including the start and end points of the original curve are points o, p, q, r, s, t, u, and v indicated with square dots. These points are stored as sampling points in the memory 45.

The coordinates of the sampling points in the memory 45 are interpolated with curves, to provide the approximate curve of FIG. 12B. This curve involves the characteristic points such as the extremal curve value point, inflection points, and extremal error value points of the original curve as well as the auxiliary points among the characteristic points, so that the approximate curve of FIG. 12B is closer to the original curve than that of FIG. 10B.

As explained above, the first to third aspects of the present invention employ the characteristic points such as the extremal error value points, extremal curve value points, and inflection value points of an original curve as well as intermediate points between the characteristic points as sampling points to provide a high-quality approximate curve, of the original curve, at high speed.

We claim:

1. A sampling point generating apparatus comprising:

means for drawing a straight line between the start and end points of an original curve;

means for calculating errors between the coordinates of the original curve and the coordinates of the straight line;

means for detecting at least one extremal error value point where increase or decrease in the errors is reversed; and means for generating an auxiliary point between each pair of neighboring points of the at least one extremal error value point and between the start and end points, wherein the start and end points, the at least one extremal error value point and the auxiliary points serve as sampling points to provide a cubic curve that approximates the original curve.

2. The apparatus according to claim 1 further comprising means for detecting extremal curve points on the original curve, the extremal curve value points being used as the start and end points.

3. The apparatus according to claim 2 further comprising means for detecting inflection points where an increase or decrease in the inclination of tangents of the original curve is reversed, the inflection points being used as the start and end points.

* * * * *

UNITED STATES PATENT AND TRADEMARK OFFICE
CERTIFICATE OF CORRECTION

PATENT NO. : 5,568,601
DATED : October 22, 1996
INVENTOR(S) : Toshiya YAMAUCHI, et al.

It is certified that error appears in the above-indentified patent and that said Letters Patent is hereby corrected as shown below:

Col. 1, line 48, delete "10".

Col. 3, line 16, delete "a".

Col. 7, line 64, delete "more".

Signed and Sealed this

Eighteenth Day of February, 1997

Attest:

BRUCE LEHMAN

Attesting Officer

Commissioner of Patents and Trademarks